United States Patent Office 2,818,425
Patented Dec. 31, 1957

2,818,425

4-(CHLOROPHENOXY)VALERIC ACIDS

Basil Jason Heywood, Hornchurch, England, assignor to May & Baker Limited, Dagenham, England, a British company No Drawing. Application January 3, 1956
Serial No. 556,774

Claims priority, application Great Britain
January 10, 1955

4 Claims. (Cl. 260—473)

This invention is for improvements in or relating to aryloxyaliphatic compounds and to compositions containing one or more of such compounds and useful for the modification of plant growth.

The use in agriculture and horticulture of various types of chemicals for the purpose of modifying plant growth is now a customary practice, and a considerable number of such substances are employed on a very large scale for producing various different effects upon plant growth. These effects include modification of growth for the purpose of enhancing the useful yield of crops later to be gathered from the plants so modified, and the destruction of unwanted plants, i. e. weeds in areas containing useful crops.

Of recent years, the so-called "auxins" have become particularly important as selective herbicides, their lethal effect being a physiological and systemic one rather than that of a plant poison which simply alters and destroys. The advent of such highly successful auxins as 2:4-dichlorophenoxyacetic and 4-chloro-2-methylphenoxyacetic acid derivatives has greatly stimulated research and development throughout the world but there is still much that is not known concerning the precise relationship between chemical structure of the auxin and effect upon plant growth as to variation of effect according to concentration and structure of the chemical employed (in some cases the chemical acts at low concentration to modify plant growth in a useful way and at a higher concentration to kill the plant) such that prediction as to effect on plant growth of change in chemical structure of the auxin cannot yet be made with anything like reasonable certainty. This is particularly so in the field of the aryloxyaliphatic compounds. Thus, Synerholm and Zimmerman (contributions of the Boyce Thompson Institute 14, (7): 369–382, 1947) who have carried out a considerable amount of research in the field concluded in the case of the ω-(2:4-dichlorophenoxy)aliphatic acid series that they are physiologically active or inactive depending upon whether they contain respectively an even or odd number of carbon atoms in the aliphatic acid portion of the molecule. They further pointed out that it is impossible to extend the generalisation to include all growth regulators of the aryloxyaliphatic acid type, observing inactivity in, e. g. the chlorophenoxybutyric acid series. Until recently, it appears to have been generally accepted that this activity of the higher members of the series containing an even number of aliphatic carbon atoms arises through degradation thereof in the plant to the corresponding member of the active acetic acid series. In any event, the few aryloxyaliphatic compounds that have been used on any substantial scale as selective herbicides, all belong to the acetic acid series. And while those compounds of the acetic acid series are of considerable value, their range of application and general utility are limited by reason inter alia of the fact that they have a detrimental effect upon important useful crops.

Recently, however, Wain, R. L. and Wightman, F. ((1954) Proc. Roy. Soc. (B) 142 525) has shown that specific β-oxidase enzyme systems may be present in the tissues of different plant species and that there may be a definite relationship between the enzyme make-up of a particular plant tissue and the chemical character of, including more particularly the nature and position of nuclear substituents in, an ω-aryloxyalkanecarboxylic acid type hormone herbicide derived from straight chain aliphatic acids higher in the series than acetic acid such that, due to the enzyme system specific to the plant species in question, a specific type of such herbicides is not degraded in that plant to the active acetic derivative, but is nevertheless so degraded within the tissues of many common weeds of the type normally to be found in association with the plant species in question. More specifically, Wain has shown that certain compounds of the butyric and higher homologous series are effective selectively to eradicate weeds in useful crops (for example, clover) for which the hitherto-used aryloxyacetic compounds could not be employed successfully because of their destructive effect not only upon the weeds but also the useful crops themselves.

It is the object of this invention to provide new aryloxyaliphatic compounds and compositions containing them which possess useful plant growth regulating properties which could not have been predicted from knowledge of their chemical structure, and which offer substantial advantage over chemically related compounds previously known or proposed as plant growth regulants.

The compounds of the present invention are the γ-phenoxy-γ-alkylbutyric acids of the formula:

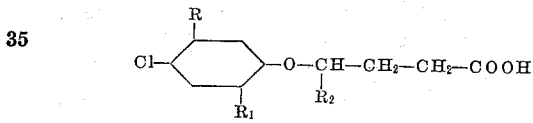

wherein R represents a hydrogen atom and $R_1$ represents a hydrogen or chlorine atom or a methyl group or R and $R_1$ both represent chlorine atoms and $R_2$ represents an alkyl group containing not more than 4 carbon atoms, preferably a methyl group, together with the salts, esters and amides of these acids.

Individual acids of the present invention are: γ-(4-chlorophenoxy) - γ - methylbutyric acid, γ - (4 - chloro-2-methylphenoxy)-γ-methylbutyric acid, γ-(2:4-dichlorophenoxy)-γ-methylbutyric acid and γ-(2:4:5-trichlorophenoxy)-γ-methylbutyric acid. Their plant growth regulating effect varies according to the substituents contained in the benzene ring. Thus, the 4-chloro-2-methyl compounds are selective herbicides, while the 4-chloro, 2:4-dichloro and 2:4:5 trichloro compounds (especially the dichloro compounds) are surprisingly effective in the prevention of fruit drop.

By way of illustration of the advantages of the products of the invention, the results of some of the comparative tests carried out by the present applicants are now given.

For brevity, the compounds 2-methyl-4-chlorophenoxyacetic acid, 2:4:5-trichlorophenoxypropionic acid, γ-(2-methyl-4-chlorophenoxy)butyric acid, γ-(2-methyl-4-chlorophenoxy)-γ-methylbutyric acid, γ-(2:4-dichlorophenoxy)-γ-methylbutyric acid, and γ-(2:4:5-trichlorophenoxy)-γ-methylbutyric acid are designated "MCPA," "2:4:5–TP," "MCPB," "MCPMB," "2:4–DMB" and "2:4:5–TMB" respectively.

(a) *Pot experiments showing efficiency of MCPMB as herbicide.*—Seedlings of the following crops and weeds were sprayed to run off with aqueous solutions containing 0.4% respectively of the sodium salts of MCPA, MCPB and MCPMB at a rate of 50 English gallons per acre.

After four weeks, observations were recorded as follows:

TABLE I

| Species | MCPMB | MCPB | MCPA |
|---|---|---|---|
| Weeds: | | | |
| Chickweed | Severe damage. | Slight damage. | Slight damage. |
| Poppy | Dead | Dead | Dead. |
| Fat hen | ----do---- | ----do---- | Do. |
| Charlock | ----do---- | ----do---- | Do. |
| Crops: | | | |
| White clover | Slight damage. | Unaffected | Severe damage. |
| Dwarf french bean | Unaffected | Moderate damage. | Dead. |
| Broad bean | ----do---- | Severe damage. | Do. |

The foregoing results show that as compared to MCPA the compound of the invention, viz., MCPMB, has the important advantage of destroying typical weeds without, however, affecting any of the named useful crops. As compared to MCPB, the compound of the invention presents the advantage of a far greater effect upon chickweed.

(b) *Field experiments showing the advantages of 2:4-DMB and 2:4:5-TMB as compared to 2:4:5-TP.*—(In this experiment the selected acids were employed as their triethanolamine salts. It should here be explained that 2:4:5-TP was chosen as reference compound because of its known utility, as compared to compounds of related chemical structure, in the prevention of fruit drop.)

Apple trees of the variety Cox's Orange Pippin (dwarf) were sprayed while in the fruitlet stage with aqueous solutions containing 10 and 20 p. p. m., calculated as the acid, of 2:4-DMB and 2:4:5-TMB and compared with the same concentrations of 2:4:5-TP. The crop was picked 14 weeks later and graded according to the size of the fruit (size I, diameter greater than 2½″, size II, 1½ to 2½″, size III, less than 1½″). The results were as follows:

TABLE II

| Compound | Mean Number Apples per Tree at Harvest | | | |
|---|---|---|---|---|
| | Total | Size I | Size II | Size III |
| 2:4:5-TP: | | | | |
| 10 p. p. m | 171 | 16 | 52 | 103 |
| 20 p. p. m | 116 | 0 | 8 | 108 |
| 2:4-DMB: | | | | |
| 10 p. p. m | 58 | 38 | 17 | 3 |
| 20 p. p. m | 74 | 51 | 12 | 11 |
| 2:4:5-TMB: | | | | |
| 10 p. p. m | 56 | 32 | 24 | 0 |
| 20 p. p. m | 39 | 8 | 20 | 11 |
| Untreated | 29 | 19 | 10 | 0 |

It will be observed that, although the highest total yield was achieved with 2:4:5-TP, the preponderating percentage of yield in that case was of size III apples, the economic value of which is normally regarded as insignificant compared to apples of larger average diameter.

In addition, at 20 p. p. m. 2:4:5-TP caused severe leaf damage, principally in the form of severe distortion, whereas neither of the other two compounds caused any damage whatever, even at 40 p. p. m.

The compounds of the present invention may be prepared from the readily available intermediate γ-valerolactone, by heating that substance under substantially anhydrous conditions with an alkali metal salt, for example, the sodium salt, of the phenol corresponding to the compound desired. Such process is illustrated by the examples which follow. As the compounds of the present invention can exist as optical isomers, which isomers, as well as mixtures thereof, and the corresponding racemates are included within the scope of the present invention, the process may, if desired, include the step of resolution.

For industrial use the compounds of this invention may be employed in any of the physical forms in which plant growth regulants or herbicides of the 2:4–D type are customarily used; in all cases in association with an inert diluent. In the case of water-soluble compounds, e. g. the alkali metal salts, it is convenient to employ an aqueous solution where application in liquid form is desired. Alternatively, they may be used as solid compositions in conjunction, therefore, with solid diluents such as talc, clay or other such inert material. In the case of compounds insoluble or but sparingly soluble in water, it is convenient to employ them in the form of an aqueous emulsion incorporating a wetting, dispersing or emulsifying agent of the ionic or non-ionic type, the latter being preferred since they are not affected by electrolytes. The latter type of formulation is preferably made up as a self-emulsifying concentrate containing the active substance dissolved in the dispersing agent or in a solvent compatible with that dispersing agent, the composition being made ready for use by the simple addition of water. Specific compositions include aqueous solutions of water-soluble salts which may contain a wetting agent, wettable powders containing either acid or amide in association with diluent powder and wetting agent, oil emulsions containing one or more of the esters and micronised oil suspensions of either acid.

The present invention is illustrated by the following examples:

*Example I*

4-chloro-2-methylphenol (71.25 g.) is converted to its dry sodium salt by azeotropic distillation with chlorobenzene in the presence of caustic soda (5% excess. γ-Valerolactone (62.5 g.) is added and chlorobenzene is distilled off until the liquid reaches a temperature of 180° C., which is then maintained for 2½ hours under reflux. Water is then added and the solution is steam-distilled to remove unchanged 4-chloro-2-methylphenol. After cooling, the product is precipitated by the addition of sulphuric acid and dried at 35° C. Recrystallisation from petroleum ether gives γ-(4-chloro-2-methylphenoxy)-γ-methylbutyric acid, M. P. 75–76° C. This acid is resolved by conversion to a salt with either D or L 2-phenylisopropylamine. The dried salt is repeatedly crystallised from petroleum ether. On conversion back to the free acid, oils are obtained which have the rotation of $[\alpha]_D^{18}$ of +39.0 and −39.3 (both in ethyl alcohol), respectively.

*Example II*

2:4-dichlorophenol (81.5 g.) is converted to its dry sodium salt by azeotropic distillation with chlorobenzene in the presence of caustic soda (42 cc.: 50%). γ-Valerolactone (62.5 g.) is added and the temperature of the melt maintained at 180° C. for 2½ hours. Working up as in Example I yielded γ-(2:4-dichlorophenoxy)-γ-methylbutyric acid, M. P. 66–67° C.

*Example III*

4-chloro-2-methylphenol (14.25 g.) is converted to its dry sodium salt by azeotropic distillation with n-butanol in the presence of caustic soda (5% excess). γ-Valerolactone (12.5 g.) is added and the temperature of the reaction mixture allowed to rise to 155° C. while some of the excess n-butanol is allowed to distil out. The melt is held at 155°±5° C. for four hours and then the reaction product product is isolated in the same way as that given in Example I.

*Example IV*

In place of the 4-chloro-2-methylphenol used in Example III, 2:4:5-trichlorophenol is employed. Using exactly the same reaction conditions, γ-(2:4:5-trichlorophenoxy)-γ-methylbutyric acid, M. P. 64–65° C., is obtained.

*Example V*

In place of the 4-chloro-2-methylphenol used in Example III 4-chlorophenol is employed. Using exactly the same reaction conditions, γ-(4-chlorophenoxy)-γ-methyl-butyric acid, M. P. 62–64° C. is obtained.

Example VI o-Cresol is reacted with γ-valerolactone in a similar way to that described in Example III to give γ-methyl-γ-phenoxybutyric acid, M. P. 78–79° C. 194 g. of this compound is heated to 100° C. when sulphuryl chloride (10% molar excess) was run in gradually to the stirred molten compound. Hydrogen chloride and sulphur dioxide were evolved vigorously. The reaction was maintained at 100° C. for two to three hours and then poured into water. Sodium bicarbonate was added, the solution treated with carbon, and, after filtering, the γ-(4-chloro-2-methylphenoxy)-γ-methylbutyric acid thrown out by the addition of acid. Isomer-free product could be obtained by crystallisation of this crude reaction product from aqueous methanol.

In place of the sulphuryl chloride, chlorine and a catalyst, for example, iodine, ferric chloride, could be employed.

Example VII

γ-(4-chloro-2-methylphenoxy)-γ-methylbutyric acid (121.25 g.), n-butanol (100 cc.) and concentrated sulphuric acid (2 cc.) were stirred and heated in such a way that the butanol distilling removed the water from an azeotropic separator. After six hours, when no more water was separating, the reaction product was cooled, diluted with water and acidic materials removed by an alkali wash. Distillation in vacuum gave pure n-butyl γ-(4-chloro-2-methylphenoxy)-γ-methylbutyrate as a colourless liquid, boiling at 157–158° C. at 0.3 mm. Both the crude ester and the distilled ester are suitable for the preparation of formulations for use as selective herbicides. In a similar manner, there may be prepared n-butyl γ-(4-chlorophenoxy)-γ-methylbutyrate boiling at 126–30° C. 0.11–0.14 mm.

Example VIII

γ-(4-chloro-2-methylphenoxy)-γ-methylbutyric acid (28.5 g.), β-n-butoxyethanol (24.8 g.), concentrated sulphuric acid (0.8 cc.) and benzene (100 cc.) were heated as above and the water again removed continuously. The ester was purified in the same way as that described in the preceding example and the product, β-n-butoxyethyl γ-(4-chloro-2-methylphenoxy)-γ-methylbutyrate, boiled at 189–190° C. at 0.3 mm. Again, both the crude and the pure ester are suitable for the preparation of non-volatile formulations of selective herbicides.

Example IX

γ-(2:5-dichlorophenoxy)-γ-methylbutyric acid (14.25 g.) was refluxed for two hours with an excess of thionyl chloride. The excess thionyl chloride was removed first at ordinary pressure and then in vacuum to give a residue of the corresponding acid chloride. The acid chloride was run into an excess of an amine, for examine ammonia, and the amide formed was isolated. When ammonia was used the product was filtered off and crystallised from benzene-petroleum ether to give γ-(2:4-dichlorophenoxy)-γ-methylbutyramide, M. P. 82–83° C.

For the purpose of the invention the aforesaid new compounds will be used in a concentration of at least 0.0002% by weight, the balance consisting of a vehicle, fillers, etc. The optimum concentration will naturally vary according to the intended purpose but, in general, in the case of herbicidal compositions concentrations of at least one lb. per acre, and in the case of fruit drop formulations, concentrations of 20–40 parts per million by weight for normal high volume spraying, rising to 400 to 800 parts per million if very low volume applications are employed, will be satisfactory.

The following are illustrative examples of plant growth regulating compositions according to the invention; parts stated are by weight unless otherwise specified:

Example X

| | |
|---|---|
| Sodium γ-(2-methyl-4-chlorophenoxy)-γ-methyl-butyrate (acid dissolved in theoretical quantity of caustic soda) parts | 47 |
| Ethylene di-amine tetra-acetic acid do | 0.2 |
| Sodium hydroxide do | 0.5 |
| Water to parts by volume | 100 |

The foregoing constitutes a stock concentrate one part by volume of which can be added to 29 parts by volume of water for weed control application at the rate of 15 gallons per acre.

Example XI

In the concentrate of Example X the said sodium salt was replaced by 50 parts of the corresponding potassium salt.

Example XII

To either of the formulations of Example X or XI, 2.0 parts by weight of sodium lauryl sulphate may be added.

Example XIII 42 parts by weight of γ-(4-chloro-2-methylphenoxy)-γ-methylbutyric acid was warmed with 25 parts by weight of diethanolamine until the acid had dissolved. Water was added to give 100 parts by volume.

One part by volume of this concentrate could be diluted with 14 parts by volume of water for weed control application at the rate of 15 gallons per acre.

Example XIV

In a formulation of the type described in Example XIII 20 parts of diethylamine were substituted for the diethanolamine.

Example XV

In formulations as described in Examples XIII and XIV, a quantity of "Texofor" F, a non-ionic wetting agent of the alkyl phenol-ethylene oxide type, may be incorporated.

The next following example illustrates ester formulations made up as emulsions. These are usually prepared in the form of self-emulsifying concentrates in which the ester and the emulsifying agent is dissolved in a larger bulk of a solvent (usually a mineral oil or an aromatic solvent such as xylene) or in which the emulsifying agent is dissolved in the ester with the possible addition of a small bulk of a co-solvent.

Example XVI

| | |
|---|---|
| Ethyl γ-(4-chloro-2-methyl-phenoxy)-γ-methylbutyrate parts | 48 |
| Sodium di-nonyl sulpho-succinate do | 3 |
| "Texafor" D40 (a castor-oil polyethylene oxide condensation product) do | 11 |
| Shell oil 132 (a light grade mineral oil) to parts by volume | 100 |

1 part by volume of this concentrate can be mixed with 59 parts by volume of water to form a stable emulsion for application at the rate of 15 gallons per acre as a weed killer preparation.

Example XVII

| | Parts |
|---|---|
| Triethanolamine salts of γ-(2:4-dichlorophenoxy)-γ-methylbutyric acid (calculated as the acid) | 9 |
| Water to | 100 |

This concentrate is diluted at the rate of 200 cc. to 100 gallons of water and applied for the prevention of fruit drop at the rate of 200 to 400 gallons per acre according to the density of the orchard. It can, if desired, contain one part of Texofor F.

Example XVIII 2,000 parts of γ-(2:4-dichlorophenoxy)-γ-methylbutyramide (calculated as the acid) is made up to 1,000,000 parts with a mixture consisting of one part of talc and 3 parts of kaolin. It is applied for the prevention of fruit drop at the rate of 2 to 4 cwts. per acre according to the density of the orchard.

I claim:

1. A member of the class consisting of the γ-(chlorophenoxy)-γ-alkylbutyric acids of the formula:

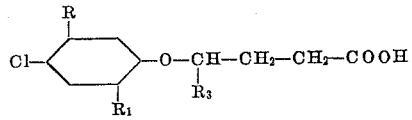

wherein, when only one of R and $R_1$ represents a substituent, R represents a hydrogen atom and $R_1$ is a member of the class consisting of hydrogen, chlorine and methyl, and, when R and $R_1$ each represents a substituent, R and $R_1$ each represents chlorine, and the salts, lower alkyl esters and amide of these acids.

2. A member of the class consisting of γ-(4-chloro-2-methyl-phenoxy)-γ-methylbutyric acid, its salts, lower alkyl esters and amide.

3. A member of the class consisting of γ-(2:4-dichlorophenoxy)-γ-methylbutyric acid, its salts, lower alkyl esters and amide.

4. A member of the class consisting of γ-(2:4:5-trichlorophenoxy)-γ-methylbutyric acid, its salts, lower alkyl esters and amide.

References Cited in the file of this patent

UNITED STATES PATENTS

| | | |
|---|---|---|
| 2,335,652 | D'Alelio | Nov. 30, 1943 |
| 2,348,231 | Strain et al. | May 9, 1944 |
| 2,449,991 | Gresham et al. | Sept. 28, 1948 |
| 2,493,126 | Foster et al. | Jan. 3, 1950 |

OTHER REFERENCES

Wain et al.: Chem. Abst., 48, 13826 (1954).